March 30, 1971  C. W. SNYDER, JR., ET AL  3,573,104
FUEL CELL UNIT WITH NOVEL FLUID CONFINING
AND DIRECTING FEATURES
Filed May 9, 1968  4 Sheets-Sheet 4
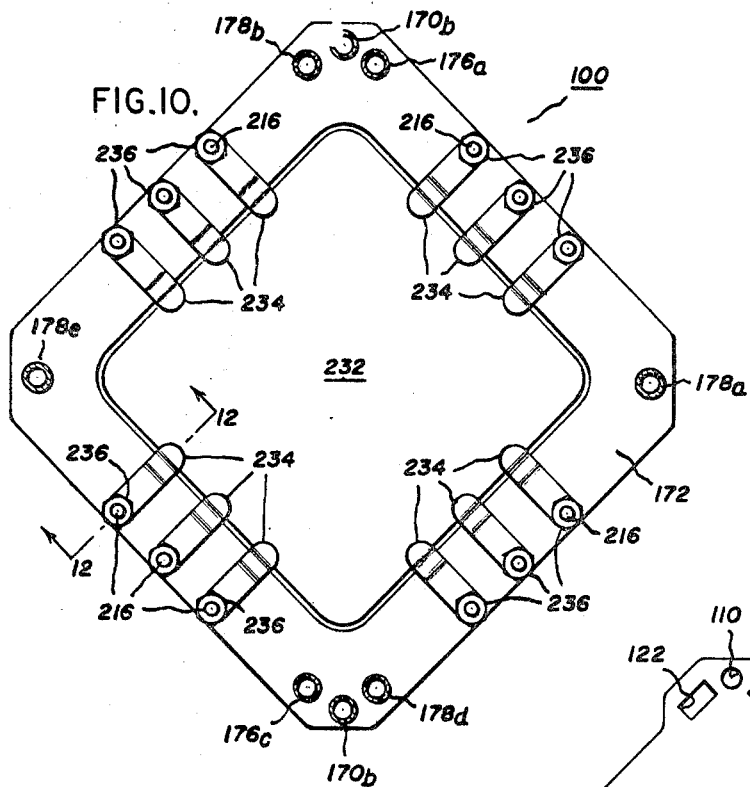
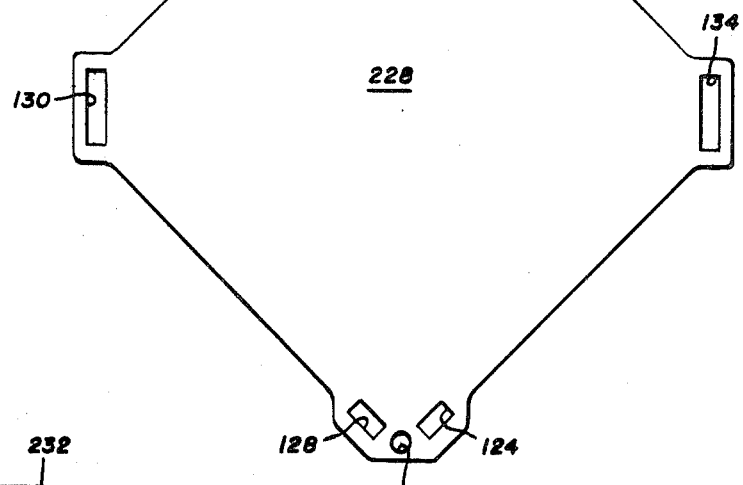
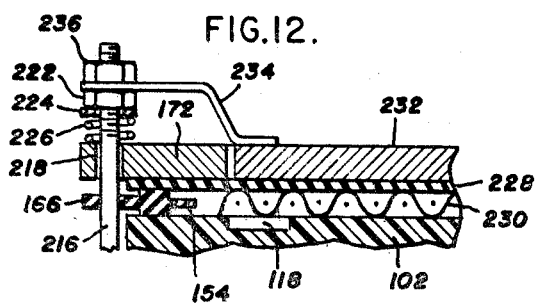
INVENTORS:
ARNOLD D. THUMIM,
CHARLES W. SNYDER,
BY *Carl O. Thomas*
THEIR ATTORNEY.

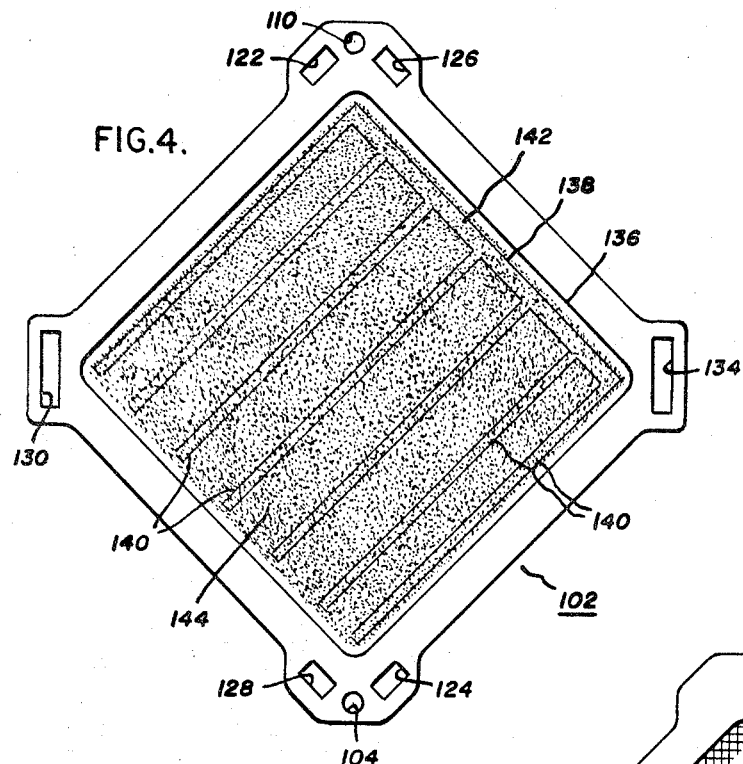
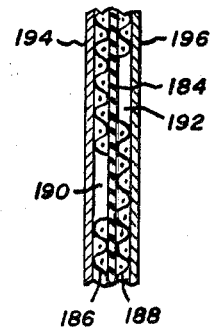
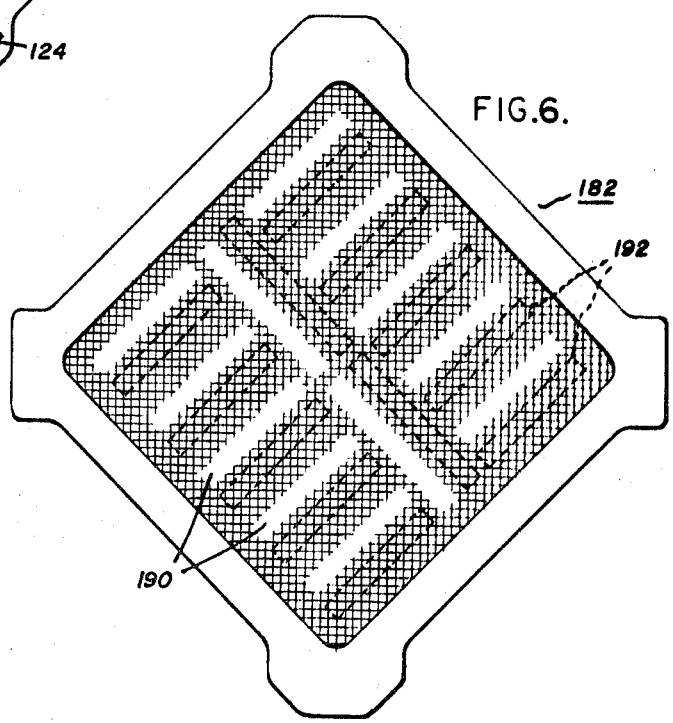
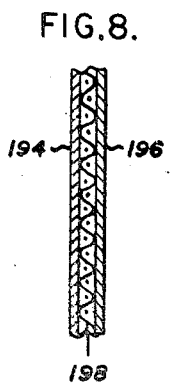
INVENTORS:
ARNOLD D. THUMIM,
CHARLES W. SNYDER, March 30, 1971  C. W. SNYDER, JR., ET AL  3,573,104
FUEL CELL UNIT WITH NOVEL FLUID CONFINING
AND DIRECTING FEATURES
Filed May 9, 1968  4 Sheets-Sheet 1
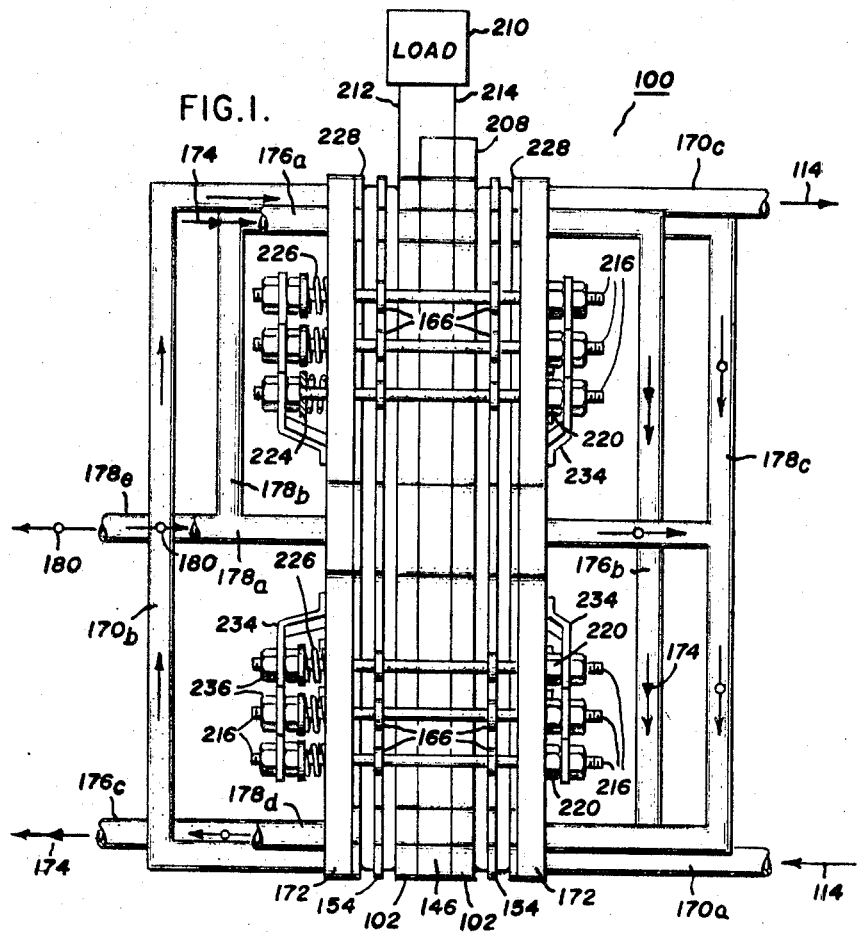
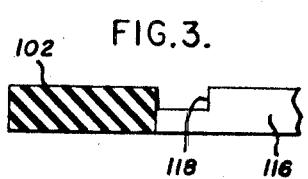
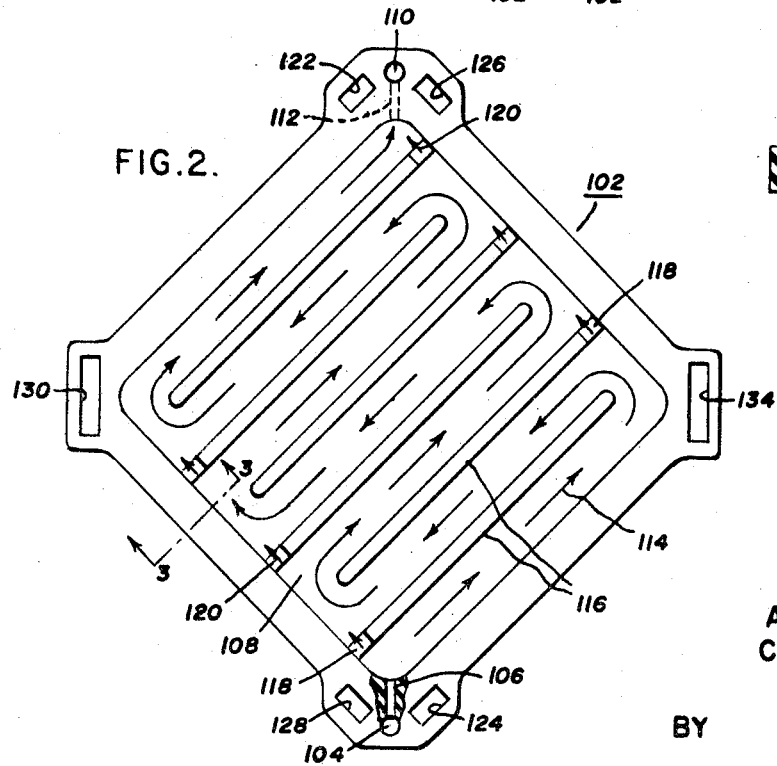
INVENTORS:
ARNOLD D. THUMIM,
CHARLES W. SNYDER,
BY  *Carl O. Thomas*
THEIR ATTORNEY.

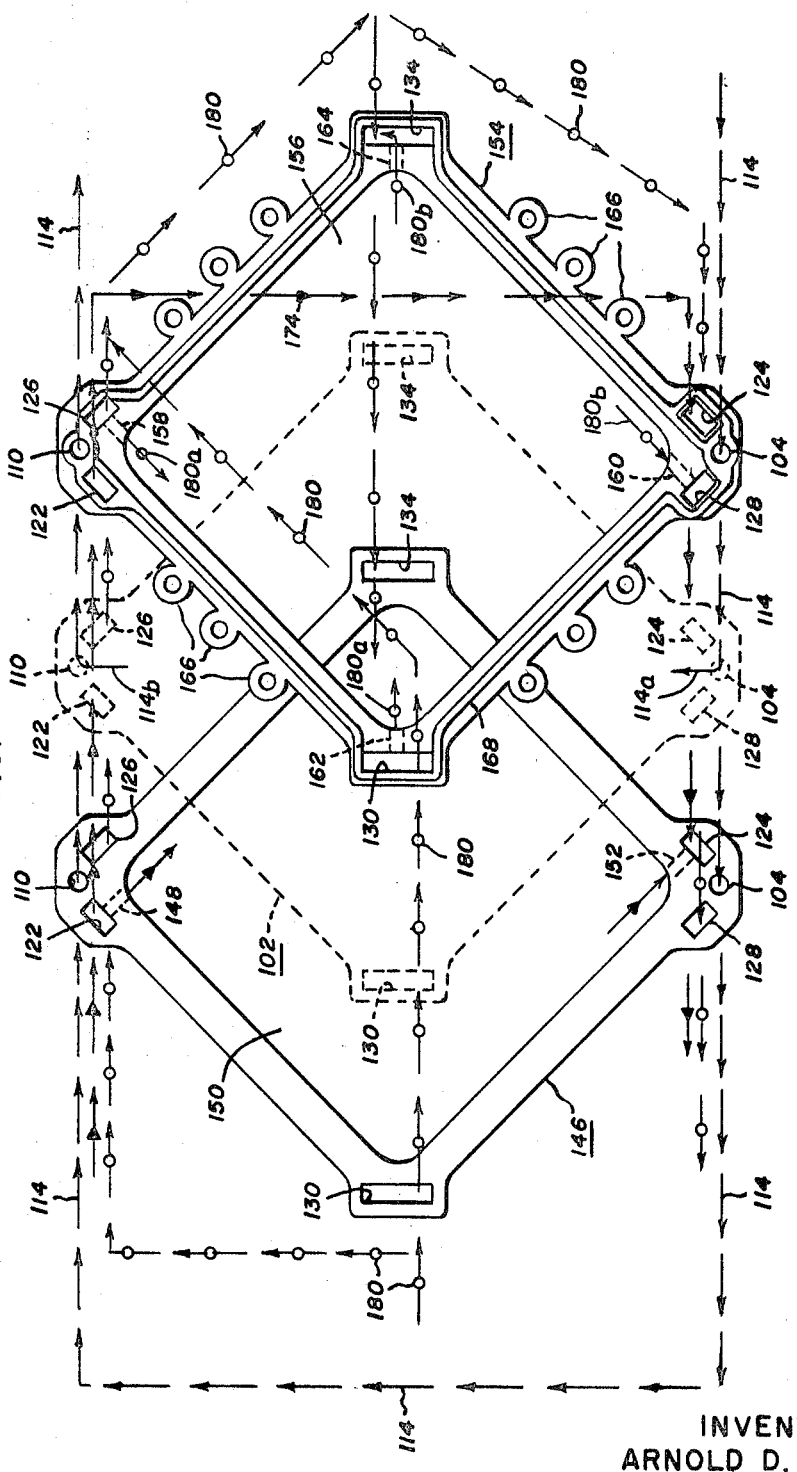

United States Patent Office 3,573,104
Patented Mar. 30, 1971

3,573,104
FUEL CELL UNIT WITH NOVEL FLUID CONFINING AND DIRECTING FEATURES
Charles W. Snyder, Jr., Beverly, and Arnold D. Thumim, Brighton, Mass., assignors to General Electric Company
Filed May 9, 1968, Ser. No. 727,790
Int. Cl. H01m 27/00
U.S. Cl. 136—86                              3 Claims

ABSTRACT OF THE DISCLOSURE

A fuel battery is disclosed provided with apertured reactant and electrolyte gaskets. The electrolyte frames are provided with notched baffle fingers to uniformly distribute fluid while the reactant frames are provided with stacked screens having offset apertures. The frames making up the fuel cell unit are held assembled by rigid frames compressively urging the peripheral portions of the gaskets and frames into engagement while not compressing the central portion.

BACKGROUND OF THE INVENTION

The essential elements of a fuel cell are an anode, a cathode, and an electrolyte providing an ion transport path therebetween. Typically a housing (usually the combination of an end plate and a peripheral gasket) is provided to seal around the periphery of the anode and to permit a fluid fuel, such as hydrogen, hydrocarbon, ammonia, etc., to be circulated across the face of the anode in a controlled manner. The cathode may be merely exposed to the atmosphere where air is the oxidant. More typically, however, a second housing, similar to that associated with the anode, is sealed around the periphery of the cathode to direct an oxident across the face of the cathode. The electrolyte may itself be a solid structural element, as in the case of an ion exchange membrane electrolyte element, or may be a fluid held by capillary forces within a porous matrix. More frequently the electrolyte is a fluid, such as a mineral acid, e.g. sulfuric acid, phosphoric acid, etc., or an alkali, such as potassium hydroxide. In such circumstances an electrolyte frame or gasket is interposed between and sealingly engaged peripherally of the anode and cathode. Electrolyte is usually circulated through the frame during operation of the fuel cell. The various elements of a fuel cell are usually held in assembled and edge sealing relationship by peripherally positioned bolts. Typical fuel cell constructions of the type disclosed are illustrated by Niedrach in Pat. No. 3,134,697 and Grubb in Pat. No. 3,328,204.

In building fuel cell units to service all but the smallest power requirements it is conventional practice to stack a plurality of elements similar to those employed in the construction of a single fuel cell as described above so as to form a battery of fuel cells—frequently termed a fuel battery. Heretofore fuel batteries have been made up by stacking the requisite number of electrodes and fluid confining gaskets between rather massive metal end plates and simply tightening bolts associated with the end plates until all the elements included in the stack are appropriately peripherally sealed together.

A number of disadvantages have been encountered with conventional fuel battery constructions. First of all, the elements of the fuel battery are in practice quite thin in order to minimize internal power losses and volume displacement. Also, elements are usually incorporated which bear against the electrodes interiorly of the gaskets. Such elements may be simply spacers, but more frequently are utilized in current collection, heat removal, and distribution of fluid flow within the gaskets. One common disadvantage encountered in practice is that by the time the peripheral bolts are tightened sufficiently to entirely seal the stack peripherally, such a large compressive force has been placed on the stack so as to buckle some electrodes into engagement interiorly of the gasketing. Another commonly encountered disadvantage is that the elements introduced into the stack to act as fluid directors and spacers frequently tend to block a portion of the electrode surface area from contact with either the electrolyte or reactant and yet do not fully insure the electrodes against buckling into contact under compression. An additional disadvantage encountered in use of a conventionally stacked fuel battery is that adjacent electrodes of dissimilar potential may be shorted by fluid accumulating and bridging the electrodes. Low level electrolyte seepage through the electrode pores accounts for one source of bridging liquid.

SUMMARY OF THE INVENTION

It is an object of our invention to provide a fuel cell unit suitably constructed to efficiently confine and direct fluids circulating therethrough while minimizing the risk of internal shorting of electrodes.

This and other objects of our invention are accomplished by providing a fuel cell unit which in one aspect is comprised of at least one electrode-electrolyte assembly including first and second spaced electrode means and electrolyte means interposed therebetween. The assembly provides a sealing surface peripherally of each of the electrode means. Gasket means sealingly cooperate with each of the sealing surfaces for distributing first and second fluid reactants into contact with the first and second electrode means, respectively. Means are provided for compressively holding the electrode-electrolyte assembly and the gasket means in sealing relation. The holding means includes flexible cover means sealingly overlying an outermost of the gasket means, and a rigid peripheral frame sealingly overlying the cover means. The peripheral frame is substantially free of compressive contact with the cover means interiorly of the gasket frame.

In another aspect our invention is directed to a subcombination comprised of first and second spaced fuel cell electrodes. Means are provided for separating said electrodes and for confining and permitting circulation of a fluid between the electrodes. Means are located interiorly of the separating means for distributing the fluid during contact with the electrodes. This means is comprised of a plurality of fluid pervious elements arranged in overlying relation, each of the pervious elements being provided with at least one fluid distribution channel. The channels are relatively offset so that at least one of the pervious elements lies between the electrodes within the area defined by any channel.

BRIEF DESCRIPTION OF THE DRAWINGS

Our invention may be better understood by reference to the following detailed description considered in conjunction with the drawings, in which FIG. 1 is an elevation of a fuel cell unit constructed according to our invention, FIG. 2 is an elevation of an electrolyte frame or gasket, FIG. 3 is a sectional detail taken along section line 3—3 in FIG. 2, FIG. 4 is an elevation of electrode-electrolyte assembly, FIG. 5 is an elevation of two reactant directing gaskets with the electrolyte directing frame being shown in phantom and the flow path of electrolyte and reactants being schematically indicated, FIG. 6 is an elevation of a gasket and fluid distributor in combination, FIGS. 7 and 8 are sectional details of fluid distributors fashioned according to our teachings and the prior teachings in the art, respectively, FIG. 9 is a sectional detail of a modified gasket and fluid distributor in combination, FIG. 10 is an end view of our fuel cell unit, FIG. 11 is an elevation of a flexible cover sheet, and FIG. 12 is a section taken along line 12—12 in FIG. 10.

DETAILED DESCRIPTION OF THE PREFERRED EMBODIMENT

The fuel cell unit 100 is provided with a plurality of electrolyte frames or gaskets 102 best illustrated in FIG. 2. An aperture 104 is provided in the lower corner of the frame for the circulation of a liquid electrolyte. An embedded conduit 106 communicates the aperture 104 with a central open area 108 defined by the frame. An aperture 110 is provided in the upper corner of the frame and a conduit 112 is provided communicating the central area with the upper aperture. To insure that the electrolyte, designated schematically by flow arrows 114, sweeps in a substantially uniform manner through the central area, a plurality of baffle fingers 116 are provided extending from the frame into the central area. The baffle fingers are provided with notches 118 adjacent their point of intersection with the frame. A small fraction of the electrolyte passes through the notches as indicated by flow arrows 120. The notches located at the upper extremity of the baffle fingers are provided to prevent gases entrained in the electrolyte from being trapped by the baffle fingers. Without notches small gas pockets would be likely to form beneath each downwardly extending baffle finger adjacent its point of connection with the frame. The notches provided in the lower extremity of the baffle fingers are included to allow liquid electrolyte to be completely drained from the unit during shutdown rather than being trapped by the baffle fingers. This is of particular importance when an electrolyte is employed which solidifies during cooling, such as concentrated phosphoric acid. Allowing the electrolyte to solidify within the fuel cell unit during shutdown would require heating of the unit to operating temperature prior to start up. It is usually more convenient and more efficient to heat the electrolyte within an external storage plenum. The electrolyte frames are each provided with first reactant circulation apertures 122 and 124 adjacent the upper and lower corners, respectively. Second reactant circulation apertures 126 and 128 are similarly located adjacent the upper and lower corners, respectively. Auxiliary second reactant apertures 130 and 134 are located adjacent the remaining corners of the electrolyte frame.

Noting FIG. 4, an ion exchange membrane 136 is sealed to the electrolyte frame overlying the open central area. A current collector 138 comprised of collector strips 140 and bus strip 142 (each of which is optional) together with an electrocatalyst 144 together form an electrode carried by the ion exchange membrane. An identical ion exchange membrane and electrode are mounted on the reverse side of the electrolyte frame. The electrodes and electrolyte frame together form an electrode-electrolyte assembly.

The provision for supply of fluid reactants to the electrodes of the electrode-electrolyte assembly as well as circulation of electrolyte is illustrated in FIG. 5. A first reactant frame or gasket 146 is provided with first reactant circulation apertures 122 and 124 located in alignment with the corresponding apertures in the electrolyte frame. A conduit 148 embedded in the first reactant frame communicates the aperture 122 with a central open area 150 defined by this frame. A similar conduit 152 communicates the central area with the aperture 124. The first reactant frame is also provided with second reactant apertures 126, 128, 130, and 134 as well as electrolyte apertures 104 and 110. The fundamental difference between the electrolyte and first reactant gaskets is that the former are provided with conduits communicating the electrolyte conduits with the central area defined by the gasket while the latter are provided with conduits which connect the first reactant conduits with the central area.

A second reactant frame or gasket 154 is located adjacent a face of the electrode-electrolyte assembly opposite that of the first reactant frame. The second reactant gasket is provided with apertures 104, 110, 122, 124, 126, 128, 130, and 134, which correspond to and are aligned with like numbered apertures in the electrolyte and first reactant frames. A significant difference in the second reactant frame is that the apertures 126, 128, 130, and 134 are communicated with an open central area 156 of the gasket by means of conduits 158, 160, 162, and 164, respectively. About its exterior periphery the gasket 154 is provided with a plurality integrally formed eyelets 166. Identical sealing beads 168 are formed on the opposite faces of the second reactant gasket. The sealing beads are located exteriorly of each of the apertures. Additionally, the apertures which are not communicated with the central open area by conduits are completely surrounded by the sealing beads, the beads being located both interiorly and exteriorly of these apertures to prevent fluid flow either into or from the second reactant frame.

The pattern of fluid flow with respect to the first reactant, second reactant, and electrolyte gaskets is schematically illustrated by flow arrows. The pattern of electrolyte circulation is indicated by flow arrows 114. Considering FIGS. 1, 2, 5, and 10 together, it can be seen that electrolyte enters the fuel cell unit through an electrolyte conduit 170a sealingly connected to a rigid compression frame 172. The electrolyte flows through the apertures 104 in the reactant and electrolyte frames. A portion of the electrolyte, as indicated by flow arrow 114a in FIG. 5, passes through the conduit 106 embedded in the electrolyte frame to reach the central open area 108. The conduit is properly sized to allow the desired fraction of the electrolyte stream to enter the electrolyte frame. The remainder of the electrolyte continues through the apertures 104 and is available to other electrolyte frames included in the frames and gaskets stacked to form the fuel cell unit. An electrolyte conduit 170b directs the electrolyte which does not enter the inlet conduits of any of the electrolyte frames from the lower portion of the rigid frame to the upper portion. This portion of the electrolyte is then directed through apertures 110 in the frames. The fractional portion of the electrolyte that was diverted from the electrolyte stream through the conduit 106 of each electrolyte frame is returned to the electrolyte stream passing through the apertures 110 by passing through conduits 112. This is schematically illustrated by flow arrow 114b in FIG. 5. The electrolyte conduit 170c carries electrolyte away from the fuel cell unit.

The flow path of the first reactant is schematically indicated by flow arrows 174. The first reactant enters the fuel cell unit through a first reactant conduit 176a attached to one of the rigid frames. The first reactant flows through apertures 122 and 124 in the stacked frames. Flow between these apertures is through first reactant conduit 176b connected to the remaining of the rigid frames. A portion of the first reactant enters the open area 150 of each first reactant frame through conduit 148 and exits through conduit 152. The first reactant leaves the fuel cell unit through the first reactant conduit 176c.

A second reactant conduit 178a is connected with a rigid frame to communicate the second reactant, schematically designated by flow arrows 180, with the apertures 130. A branch conduit 178b communicates the second reactant with the apertures 126. Second reactant conduit 178c interconnects second reactant flows stream from the apertures 126 and 130 and delivers the second reactant to the apertures 128 and 134. The conduit 178c is sealingly fitted to the remaining rigid frame. A portion of the second reactant enters each second reactant gasket as through conduits 158 and 162 as indicated by flow arrows 180a and leaves the second reactant gasket through conduits 160 and 164 as indicated by flow arrows function of the restraining plates is to prevent the flexible cover plate from expanding outwardly if a positive pressure should develop within the fuel cell unit in operation. For example, if the second reactant were fed to the central area of the second reactant gaskets at a positive pressure, the flexible cover plates would tend to expand outwardly. Assuming the flexible cover plates possess an appreciable degree of structural integrity, this poses no particular problem and no restraining plates may be required. In order to protect the cover plates from puncture, however, the restraining plates may be used. Also, the restraining plates may be used to place just the desired degree of compression on the elements of the stack lying within the central areas defined by the frames. This level of compression will ordinarily be substantially less than the higher level of compression found necessary to insure a fluid tight seal between the stacked frames and gaskets. It should be noted that the distance between the restraining plates is rigidly fixed, whereas the distance between the rigid frames may decrease due to the application of compressive force. Thus, we have provided an improved structural arrangement that applies the correct force to both the central and peripheral regions of a fuel cell stack even though the forces required are quite different in character and magnitude.

While we have described our invention with reference to a specific, preferred embodiment it is appreciated that numerous variations may be incorporated without departing from our inventive teachings. For example, it is not necessary that the electrolyte frame or gasket 102 be provided with baffle fingers 116 or that the baffle fingers be notched at 118, although we believe this to be an advantageous arrangement. It is not necessary that ion exchange membranes be mounted on opposite sides of the electrolyte frame. Any conventional fuel cell electrode may be mounted on the opposite sides of the electrolyte frame directly or supported on an ion exchange membrane or on a porous support material. It is not necessary that our fuel cell units utilize a liquid electrolyte in a free aqueous form. The electrolyte may be immobilized in a porous matrix. Alternately an ion exchange membrane may be employed as the sole electrolyte. In the latter two circumstances the electrolyte frame may be entirely dispersed with and replaced with a matrix or ion exchange membrane of conventional composition having a geometrical configuration similar to that of the cover plate 228.

It is unnecessary to provide conduits embedded in the frames and gaskets. Ports or channels may be utilized which do not have separate conduit elements positioned therein. We prefer to utilize rigidly formed conduits in flexible frames and gaskets to better control the accessibility of the areas within the frames by the fluids being circulated. The positioning and number of the apertures is not critical and may be varied widely. Two apertures are provided in each frame for the circulation of the first reactant whereas four aperatures are provided for the circulation of the second reactant. The arrangement may be employed where hydrogen is the first reactant and air is the second reactant, since the high nitrogen content of air requires that larger volumes be circulated in spite of the stoichiometric relationship requiring two volumes of hydrogen for each volume of oxygen. It is readily apparent that if pure oxygen were substituted for air, the oxygen would be utilized in our fuel cell unit as the first reactant and hydrogen as the second reactant. The specific relation in size and number between first reactant apertures and second reactant apertures was chosen in our preferred embodiment to accommodate a fuel cell unit operated on air and impure hydrogen produced by steam reforming a hydrocarbon.

The first reactant frames and the second reactant frames may be identically constructed in the form of either reactant frame specifically disclosed. These frames may be provided with baffle fingers—with or without notches 118—similarly as are the electrolyte frames. Preferably the reactant frames are formed as specifically illustrated in FIG. 6, while the electrolyte frames are provided with baffle fingers. According to a preferred stacking technique the electrolyte and the first reactant frames may be sealed together while the second reactant frames are maintained as separate elements. Where the electrode-electrolyte assembly provides a rough surface for sealing against the sealing beads of the second reactant frames, it is specifically contemplated that one or more gaskets may be interposed between the second reactant gasket and the electrolyte frame. Auxiliary gaskets may, of course, be interposed between any other adjacent frames, if desired, without departing from the teachings of our invention.

We have described our inventive arrangement for insuring greater uniformity of fluid flow within the reactant frames by reference to a fluid impervious separator interposed between two apertured screens. The fluid impervious separator is not essential, but is advantageous since it guards against shorting of adjacent electrodes. This has been observed to occur, for example, by low level electrolyte seepage through porous electrodes during fuel cell operation. In order to achieve the stacking advantages of our teaching it is not necessary to limit the number of screens employed with offset apertures to two. Any number greater than two may be employed with like result, so long as at least one aperture is offset with respect to the remaining apertures along any section through the stacked screens. Any type of fluid pervious element may be substituted for one or more of the screens. Exemplary alternate elements include felted matts, foamed metal plaques, sintered metal plaques, etc. The fluid impervious separator may be formed integrally with the gasket with which it is associated. In such circumstance separate conduits would be provided to communicate fluid with each face, rather than a single conduit as disclosed.

It is appreciated that the advantages of our novel fluid distribution arrangements within the central portion of the fuel cell unit may be achieved whether our novel rigid frames or conventional unitary end plates are employed. It is further appreciated that all of the advantages of our invention with respect to the rigid frame and restraining plate construction may be achieved if only one rigid frame and restraining plate is utilized and a conventional unitary end plate for a fuel cell stack is utilized in combination therewith. It is recognized that the rigid frame may be divided into discrete segments without disrupting its function. The use of compression springs to insure uniform compression around the periphery of our fuel cell unit is preferred, but not essential. The mounting arms for the restraining plate may be formed of a flexible material. The restraining plate may be mounted so that its inner face lies either outwardly or inwardly of the inner face of the associated rigid frame.

While we have described our invention with reference to a preferred embodiment and certain specific variations, it is appreciated that still other variations will readily occur to those skilled in the art after reviewing our teachings. It is accordingly requested that the scope of our invention be determined by reference to the following claims.

What we claim and desire to secure by Letters Patent of the United States is:

1. In a fuel cell unit comprised of:
   at least one electrode-electrolyte assembly including first and second spaced electrode means and electrolyte frame means interposed therebetween, said electrolyte frame means including a plurality of baffle elements extending from opposite sides of said frame to direct flow of said electrolyte throughout the interior portion of the frame, notch means in each of said baffle elements to allow drainage of electrolyte and removal of gases entrained in the electrolyte said assembly providing a sealing surface peripherally of each of said electrode means.

180b. The second reactant leaves the fuel cell unit through conduits 178d and 178e.

The uniform distribution of either reactant within the central area defined by the frames may be accomplished by the provision of baffle fingers such as are incorporated on the electrolyte frames. An alternate arrangement for achieving uniform reactant distribution that could, if desired, be also applied to the distribution of electrolyte is illustrated in FIG. 6. A frame 182 is illustrated schematically which may be either a first or second reactant frame. Noting FIG. 7, it can be seen that a fluid impervious separator 184 is positioned within the open central area defined by the frame. First and second fluid pervious elements 186 and 188, here illustrated as screens, are positioned on opposite sides of the separator. The screen 186 is shown provided with a plurality of apertures 190 while the screen 188 is provided with a plurality of apertures 192. When the screens are positioned within the central area the apertures are located so as to be out of alignment.

The separator 184 and screens together prevent electrodes of unlike potential, such as electrodes 194 and 196, schematically illustrated in FIG. 7, from being pressed into contact and shorting during assembly of a fuel cell unit. If the electrodes were separated by a single screen, such as screen 198 shown in FIG. 8, as is conventional practice, it can be clearly seen that if the screen were apertured and the electrodes placed under compression a significant risk of shorting the electrodes would be provided. Further, the screen 198 could only be formed of or coated with a non-conductive material. In our construction the screens may be formed of a conductive metal so that they may serve as current collectors as well as for fluid reactant distribution. The separator is in this case formed of an electrically insulative material to prevent shorting of adjacent screens. When the separator is omitted, the screens are formed of or coated with insulative material. It is noted that this arrangement is still superior to the use of a single screen, however, since the electrodes still cannot be pressed into shorting contact. In all forms the screens provide greater areal support for adjacent electrodes than could be provided by baffle fingers.

Fluid introduced into the central area defined by the frames migrates from the inlet conduit to the outlet conduit by penetration of the screens. If no apertures were provided in the screens, the fluid flow would tend to channel into the path of least resistance between the conduits. By providing apertures in the screen the impedance to fluid flow is reduced in the areas occupied by the apertures. Accordingly, the provision of apertures breaks up the tendency of the fluid flow through the screen to become channeled and contributes to the fluid flow more uniformly across the central area. It is our inventive recognition that by reducing the impedance of fluid flow in certain areas fluid flow may be rendered more uniform, whereas the conventional approach has been to provide baffle fingers to positively deflect the fluid so as to uniformly cover the central area. Our approach offers the significant advantage in that no portion of the electrode surfaces is blocked from contact with the fluid being circulated as would occur by the provision of baffle fingers. Rather, the electrode areas in which the apertures are located are provided with improved contact with the fluid being circulated.

FIG. 9 illustrates a modification for insuring an equal division of fluid between the opposed surfaces of the separator. In this form a modified frame or gasket 200 is provided having an aperture 202 therein for circulation of a fluid. This may correspond to any one of the apertures 104, 122, 126, or 130. A port 203 is provided in the frame to communicate the aperture with the central area defined thereby. Positioning tabs 204 and 206 are formed integrally with the frame and hold the screens and separator in a position with respect to the port so that the fluid stream entering the central area splits evenly between the opposite sides of the separator. Absent the positioning tabs the amount of fluid passing toward one or the other sides of the separator may vary from frame to frame so that some electrodes are supplied with excess quantities of fluid while other cells are provided with insufficient fluid contact for optimum performance.

In forming a fuel cell unit according to our invention any number of frames and gaskets may be stacked together, depending on the number of cells that are required to meet the power requirements to be placed on the unit. The three frame stack illustrated in FIG. 5 is the minimum number of frames necessary to form a fuel cell unit. In FIG. 1 the fuel cell unit 100 is shown merely for purposes of illustration as a two cell, back-to-back fuel battery. The two cells incorporated in the unit are electrically connected in series as schematically illustrated by lead 208 connecting one electrode of one cell exposed to the first reactant to one electrode of the remaining cell exposed to the second reactant. The remaining electrodes of the cells are connected to an electrical load 210 by leads 212 and 214. The cell unit is referred to as of back-to-back construction, since a common first reactant frame is utilized by adjacent cells. If it is desired to add another cell to the stack, one of the second reactant frames already present would be utilized to service the newly added cell. Only an electrode-electrolyte assembly and first reactant frame would be added to the stack.

To hold the stacked frames and gaskets in assembled relation, a plurality of tie rods 216 are positioned around the periphery of the cell unit and extend through openings 218 in the rigid frames 172. Nuts 220 engage one rigid frame and one extremity of the tie rods. Nuts 222 engage each tie rod and a washer 224 slidably fitted over the tie rod. A compression spring 226 is interposed between each washer and the adjacent rigid frame, so that the spring force causes the rigid frames and the electrolyte and reactant frames to be urged into firm peripheral engagement. It is noted that each rigid frame defines an open central area 228. Accordingly the rigid frame is urged against only the peripheral portions of the stack and no compressive force is exerted by the rigid frames on the centrally located portions of the stack. This allows a high compressive force to be uniformly distributed around the periphery of the stacked frames without any tendency toward collapsing or buckling elements located in the central portion of the stack. It should be noted that the springs contribute to the uniformity of the compressive force and also prevent decrease in this force should any gasket become permanently deformed as through cold flow or creep.

To prevent the second reactant from leaking from the central area of the second reactant frames through the central opening in the rigid frames, a flexible cover sheet 228 is interposed between the second reactant frames and the rigid frames. This is best illustrated by reference to FIGS. 11 and 12. Noting FIG. 11 it can be seen that the cover sheet is provided with apertures 122, 110, 126, 134, 124, 104, 128, and 130 which correspond to and are aligned with like numbered apertures in the electrolyte and reactant frames. To space the cover sheet from the adjacent electrode a spacer screen 230 is shown in FIG. 12 as being interposed between the cover sheet and the electrode-electrolyte assembly. The screen 230 may be apertured similarily as screens 186 and 188, if desired. Only one screen is required since the cover sheet is formed of insulative material and cannot short the electrode of the adjacent electrode-electrolyte assembly.

As an optional but preferred feature of our fuel cell unit we provide a restraining plate 232 within the central opening of each rigid frame. The holding plate is held in position by a plurality of mounting arms 234 having one end attached to the plate and a remaining end fitted over a terminal portion of a tie rod. Nuts 236 are engaged with the tie rods to hold the arms in position. The gasket means sealingly cooperating with each of said sealing surfaces for distributing first and second fluid reactants into contact with said first and second electrode means, respectively, and, means for compressively holding said electrode-electrolyte assembly and said gasket means in sealing relation, the improvement in which said holding means includes flexible cover means, a portion thereof sealingly overlying an outermost edge of said gasket means, and a rigid peripheral frame sealingly overlying said cover means, restraining means overlying said flexible cover means within said rigid peripheral frame, clamping means for simultaneously exerting force of different magnitudes on said rigid frame and the interior of said flexible cover means, said clamping means including first means for exerting force between said rigid frame and said sealing means to compress the edge of said flexible cover means whereby said peripheral frame being is sustantially free of compressive contact with said cover means interiorly of said gasket means and a plurality of arms coupled to said first means to apply force of a lesser magnitude than that applied to said rigid frame to the interior of said flexible cover means.

2. In a fuel cell according to claim 1 the added improvement in which said holding means also includes means for restraining expansion of said flexible cover means interiorly of said gasket means.

3. In a fuel cell unit according to claim 1 the added improvement in which at least one of said gasket means is comprised of a flexible frame having a sealing bead integrally molded thereon, said frame being provided with a plurality of apertures for passage of fluids, said sealing bead being located exteriorly of the apertures and also located between certain of the apertures and the interior of said frame.

References Cited

UNITED STATES PATENTS

| | | | |
|---|---|---|---|
| 2,969,315 | 1/1961 | Bacon | 136—86 |
| 3,126,302 | 3/1964 | Drushella | 136—86 |
| 3,146,131 | 8/1964 | Linden et al. | 136—86 |
| 3,378,404 | 4/1968 | Drotalevi et al. | 136—86 |

WINSTON A. DOUGLAS, Primary Examiner

H. A. FEELEY, Assistant Examiner